United States Patent
Khaledi et al.

(10) Patent No.: US 10,421,165 B2
(45) Date of Patent: Sep. 24, 2019

(54) APPARATUS AND METHODS OF INSTALLING AND VERIFYING INSTALLATION OF A SEAL MEMBER IN A COMPONENT

(71) Applicant: Honda Motor Co., Ltd., Tokyo (JP)

(72) Inventors: Jafor Khaledi, Alliston (CA); Karan Virmani, North York (CA)

(73) Assignee: Honda Motor Co., Ltd., Tokyo (JP)

( * ) Notice: Subject to any disclaimer, the term of this patent is extended or adjusted under 35 U.S.C. 154(b) by 359 days.

(21) Appl. No.: 15/465,000

(22) Filed: Mar. 21, 2017

(65) Prior Publication Data
US 2018/0272482 A1    Sep. 27, 2018

(51) Int. Cl.
*F16J 15/02*    (2006.01)
*F16J 15/32*    (2016.01)
*B23P 19/08*    (2006.01)

(52) U.S. Cl.
CPC ............ *B23P 19/084* (2013.01); *F16J 15/02* (2013.01); *F16J 15/022* (2013.01); *F16J 15/32* (2013.01); *Y10T 29/49766* (2015.01)

(58) Field of Classification Search
CPC . F16J 15/022; F16J 15/02; F16J 15/32; B23P 19/084; Y10T 29/49766
USPC ..... 277/630, 637, 642, 643, 922; 254/134.4, 254/134.3 R; 204/253, 257, 258; 205/513, 517; 73/313, 715; 188/269, 188/322.15, 282.1; 422/534, 544
See application file for complete search history.

(56) References Cited

U.S. PATENT DOCUMENTS

| | | | | |
|---|---|---|---|---|
| 5,058,415 A | * | 10/1991 | Blase | B21D 53/10 29/237 |
| 5,210,943 A | * | 5/1993 | Berkun | F16J 15/061 29/407.1 |
| 5,272,805 A | * | 12/1993 | Akeel | B23K 37/047 29/712 |
| 5,910,894 A | * | 6/1999 | Pryor | G05B 19/41875 219/121.64 |
| 7,346,997 B2 | * | 3/2008 | Rest | G01B 3/26 33/501.05 |

(Continued)

FOREIGN PATENT DOCUMENTS

| | | |
|---|---|---|
| CN | 203100620 U | 7/2013 |
| CN | 203405168 U | 1/2014 |

OTHER PUBLICATIONS

Balluff, Inc., "Sensors and RFID: The Unbeatable Team for Advanced Error Proofing," Florence, KY, available at http://www.assemblymag.com/ext/resources/ASB/Home/Files/PDFs/WP_06_ErrorProofing.pdf last visited Mar. 21, 2017, 13 pp.

(Continued)

*Primary Examiner* — Bayan Salone
(74) *Attorney, Agent, or Firm* — Armstrong Teasdale LLP (57) ABSTRACT

An apparatus for use in installing and verifying installation of a seal member in a component, and including a housing defining an interior sized to receive the component therein, and a moveable lid selectively positionable between a loading position and a sensing position. The apparatus also includes at least one seal sensor coupled to the moveable lid and configured to selectively align with a first sensing point on the component when the moveable lid is in the sensing position. The at least one seal sensor is configured to only actuate when pressed against the seal member positioned at the first sensing point.

20 Claims, 5 Drawing Sheets

(56) References Cited

U.S. PATENT DOCUMENTS 9,441,936 B2 * 9/2016 Pinkston ............... G01B 21/00

OTHER PUBLICATIONS

TR Electronic, "Power Gap Applications for Power Gap Systems," Product Brochure available at http://www.iptech1.com/pdf/trle2a.pdf, last visited Mar. 21, 2017, 28 pp.
Bird, Dave, "Quality Test & Inspection: Sensor Driven Error Proofing," Quality Magazine, Apr. 1, 2007, available at http://www.qualitymag.com/articles/84841-quality-test-inspection-sensor-driven-error-proofing, last visited Mar. 21, 2017, 7 pp.
Misumi Corporation, "Nonmagnetic Cylindrical Workpiece Detection," Product Brochure available at https://us.misumi-ec.com/us/incadlibrary/detail/000259.html, last visited Mar. 21, 2017, 4 pp.

* cited by examiner

APPARATUS AND METHODS OF INSTALLING AND VERIFYING INSTALLATION OF A SEAL MEMBER IN A COMPONENT

BACKGROUND

The field of the present disclosure relates generally to seals or gaskets and, more specifically, to an apparatus and methods for use in installing and verifying the installation of seals or gaskets in a component in an efficient and accurate manner.

At least some known internal combustion engines include a water passage structure coupled to an engine block. The water passage structure channels cooling fluid into and from the engine block, and includes at least one inlet port and at least one outlet port. The inlet port and the outlet port sometimes include a recessed groove that receives a flexible O-ring seal therein. The flexible O-ring seal facilitates restricting leakage of cooling fluid at interfaces defined between the water passage structure and the engine block. O-ring seals are typically installed manually and seated within the recessed groove. However, manually installing O-ring seals within the recessed groove may be a time-consuming and laborious task, and may result in improper installation of the O-ring seals.

BRIEF DESCRIPTION

In one aspect, an apparatus for use in installing and verifying installation of a seal member in a component is provided. The apparatus includes a housing defining an interior sized to receive the component therein, and a moveable lid selectively positionable between a loading position and a sensing position. The apparatus also includes at least one seal sensor coupled to the moveable lid and configured to selectively align with a first sensing point on the component when the moveable lid is in the sensing position. The at least one seal sensor is configured to only actuate when pressed against the seal member positioned at the first sensing point.

In another aspect, a method of installing and verifying installation of a seal member in a component is provided. The method includes positioning the component within an interior of a housing, wherein the housing includes a moveable lid selectively positionable between a loading position and a sensing position, and at least one seal sensor coupled to the moveable lid. The method also includes positioning the moveable lid in the sensing position, wherein the at least one seal sensor selectively aligns with a first sensing point on the component when the moveable lid is in the sensing position. The at least one seal sensor is configured to only actuate when pressed against the seal member positioned at the first sensing point.

DETAILED DESCRIPTION

The embodiments described herein relate generally to an apparatus and methods for use in installing and verifying the installation of seals or gaskets in a component in an efficient and accurate manner. More specifically, in one embodiment, the apparatus described herein includes a housing having a moveable lid, and a plurality of sensors coupled to the moveable lid. During operation, a component, such as a water passage structure, is mounted in the housing and the moveable lid is moved from a loading position to an installation and sensing position. The sensors extending from the moveable lid are positioned to align with pre-defined sensing points defined along the component. For example, a first sensing point is defined at a location on the component where a seal member may be installed on the component. When the moveable lid is in the installation and sensing position, the sensor at the first sensing point forces the seal member into position and is only actuated when pressed against the seal member. The sensor is not actuated when the seal member is improperly installed at the location. Indications of actuation or non-actuation of the sensors are provided on a graphical user interface and/or a lighting system on the apparatus, for example. As such, actuation or non-actuation of the sensor provides status of the installation of the seal member in the component, and the apparatus described herein facilitates seating seal members within a groove, and verifying the installation of the seal members in a quick, efficient, and easily reproducible manner.

Figure 1:
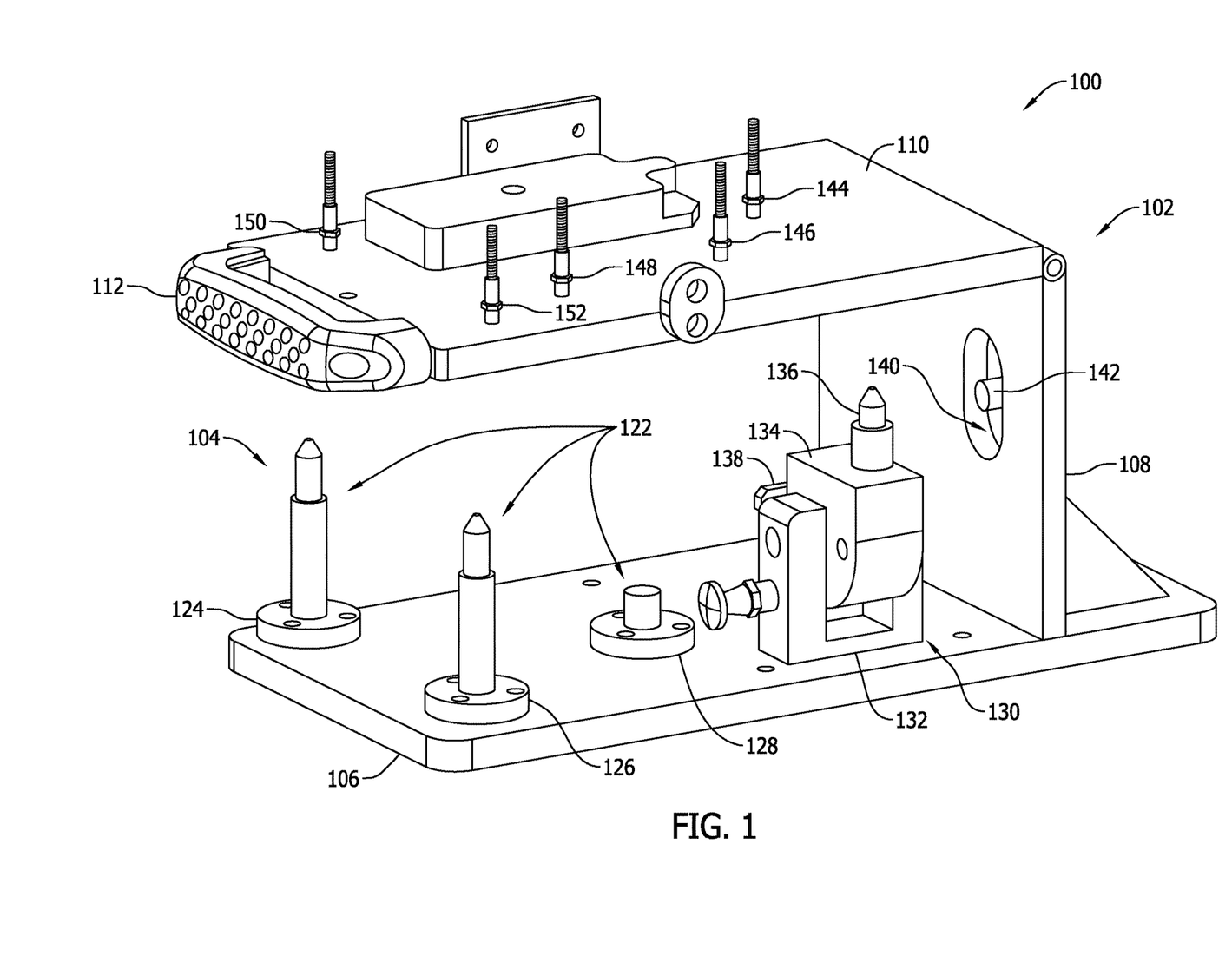
FIG. 1 is a perspective view of an exemplary apparatus for use in verifying installation of a seal member in a component.
Figure 2:
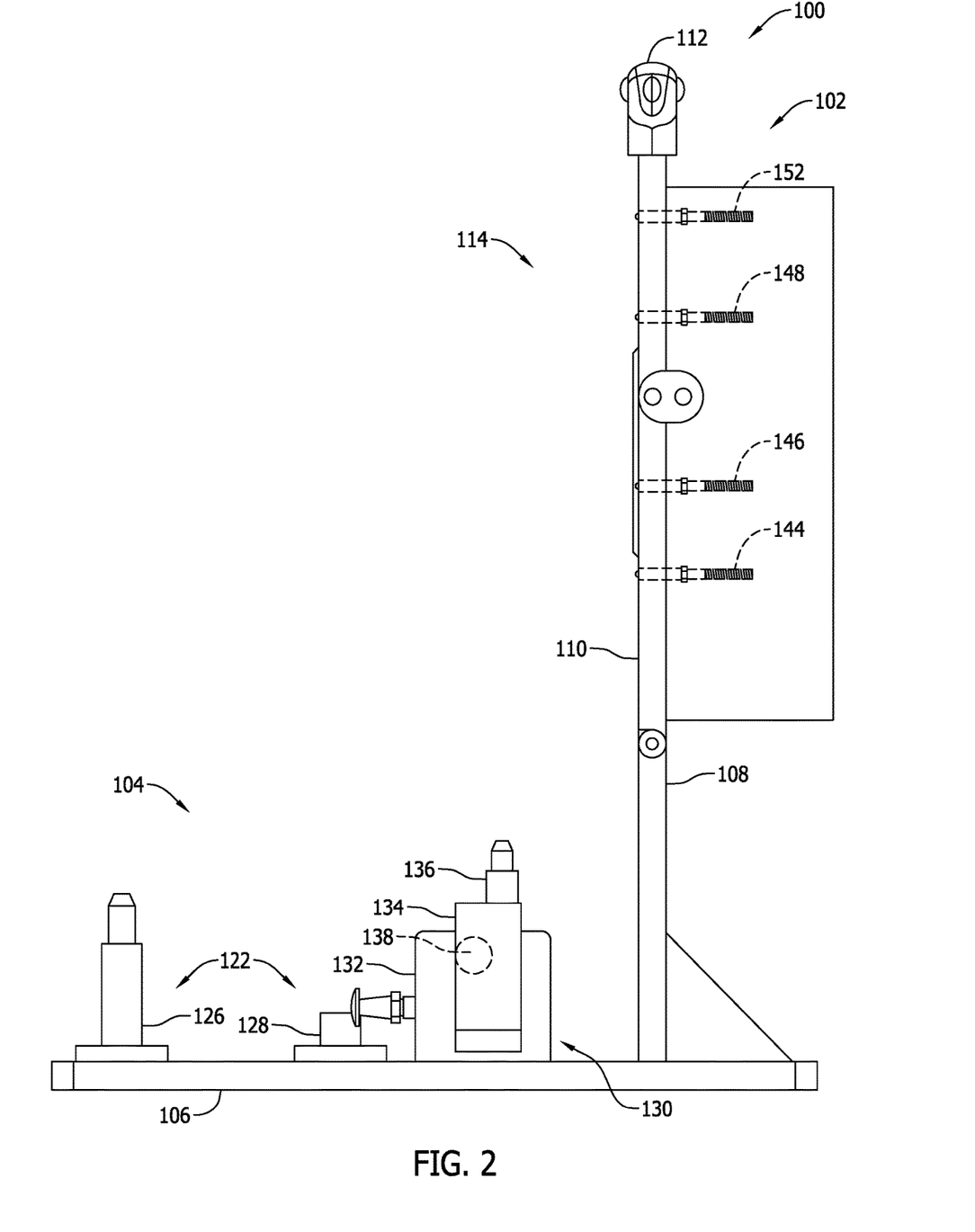
FIG. 2 is a side view of the apparatus shown in FIG. 1 and including a moveable lid in a loading position.
Figure 3:
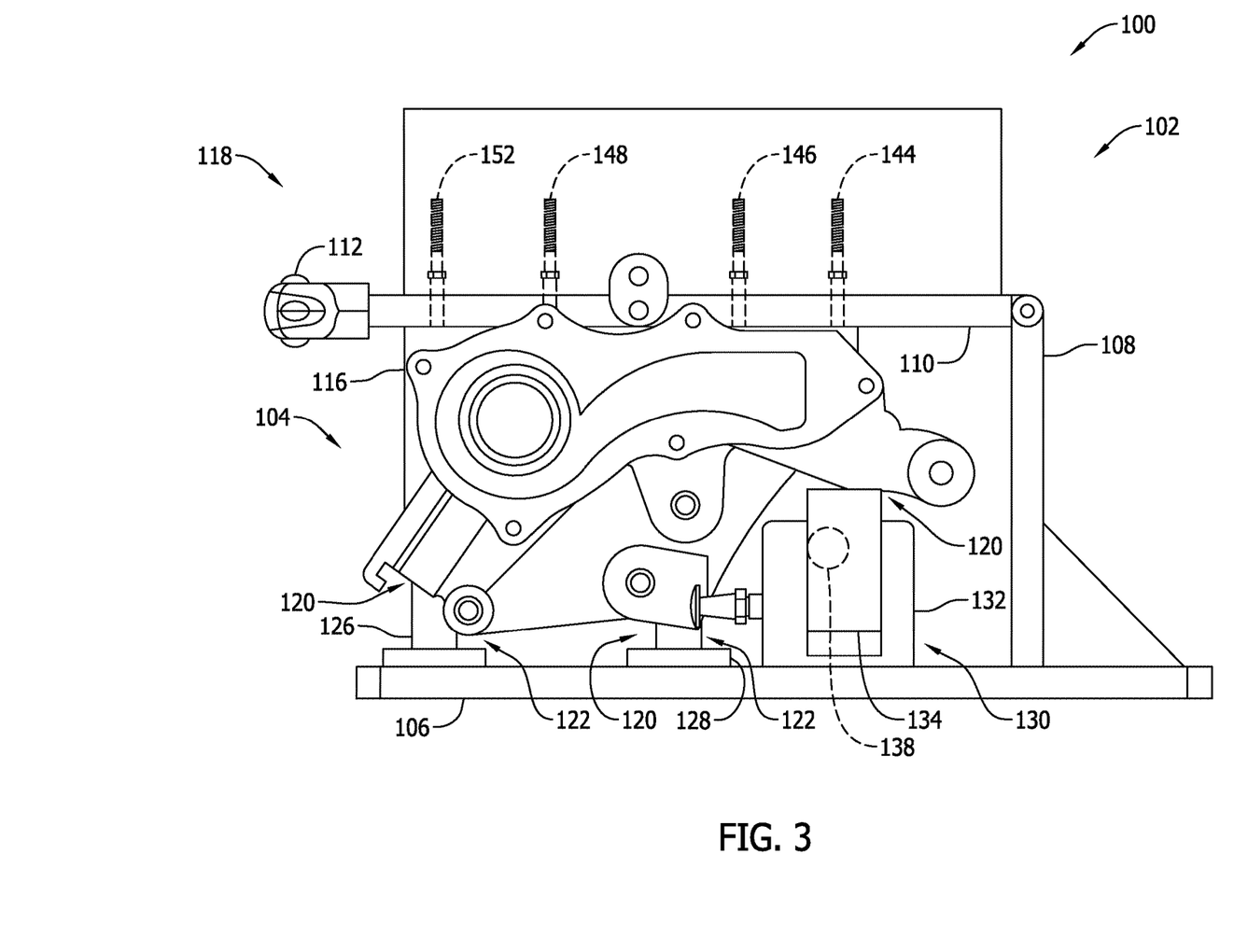
FIG. 3 is a side view of the apparatus shown in FIG. 1 and including the moveable lid in a sensing position.

FIG. 1 is a perspective view of an exemplary apparatus 100 for use in verifying installation of a seal member in a component, FIG. 2 is a side view of apparatus 100 including a moveable lid 110 in a loading position 114 (shown in FIG. 2), and FIG. 3 is a side view of apparatus 100 including moveable lid 110 in an installation and sensing position 118 (shown in FIG. 3). In the exemplary embodiment, apparatus 100 includes a housing 102 including an interior 104 defined by a bottom panel 106, a side panel 108, and a moveable lid 110 coupled to side panel 108. As will be described in more detail below, moveable lid 110 is selectively positionable between loading position 114 and installation and sensing position 118. Moveable lid 110 also includes a handle 112 that enables a user (not shown) of apparatus 100 to easily and ergonomically position moveable lid 110 between the loading position and the sensing position.

For example, as shown in FIG. 2, moveable lid 110 is in loading position 114 that enables a component 116 (shown in FIG. 3) to be received within interior 104. Referring to FIG. 3, when moveable lid 110 is in installation and sensing position 118, component 116 may be inserted within housing 102 in a predetermined orientation. For example, in the exemplary embodiment, component 116 includes at least one mounting orifice 120 defined therein and apparatus 100 includes a plurality of mounting members 122 coupled to housing 102. Mounting members 122 are sized for insertion within mounting orifices 120. The plurality of mounting members 122 enable component 116 to be mounted securely within housing 102, and are oriented and arranged such that a portion of component 116 having a seal member (not shown in FIG. 3) installed therein is oriented towards moveable lid 110.

More specifically, in the exemplary embodiment, component 116 is a water passage structure that includes mounting orifices 120 defined therein at predetermined locations. As such, the plurality of mounting members 122 are sized and arranged in a predetermined layout that facilitates mounting component 116 in the predetermined orientation. For example, in the exemplary embodiment, the plurality of mounting members 122 includes a first mounting member 124, a second mounting member 126, and a third mounting member 128. In some embodiments, apparatus 100 is designed to verify installation of seal members on different components, wherein at least one mounting orifice 120 on the different components is identical, and wherein at least one mounting orifice 120 on the different components differs in positioning, size, and/or shape. As such, in the exemplary embodiment, first mounting member 124, second mounting member 126, and third mounting member 128 are securely coupled to bottom panel 106 of housing 102 in a predetermined layout that corresponds to the identical mounting orifices 120 in the different components.

In addition, apparatus 100 includes an adaptive mounting assembly 130 coupled to bottom panel 106 of housing 102. Adaptive mounting assembly 130 includes a stationary member 132 and a rotatable member 134 that is coupled to stationary member 132. Rotatable member 134 includes a first mounting pin 136 and a second mounting pin 138 extending therefrom, and is rotatable to selectively position first mounting pin 136 or second mounting pin 138 in a vertical mounting position for mating with one of mounting orifices 120 in component 116. More specifically, in the exemplary embodiment, first mounting pin 136 and second mounting pin 138 are shaped differently from each other, and rotatable member 134 selectively positions first mounting pin 136 or second mounting pin 138 in the vertical mounting position based on the type of component received in housing 102. As such, adaptive mounting assembly 130 facilitates securing different components within housing 102 when at least one mounting orifice 120 on the various components differs in positioning, size, and/or shape.

Referring to FIG. 1, side panel 108 includes an opening 140 defined therein. In the exemplary embodiment, apparatus 100 also includes an optical sensor 142 coupled to housing 102 and oriented to analyze component 116 (shown in FIG. 3) through opening 140. For example, in operation, component 116 is positioned within housing 102, and optical sensor 142 verifies the positioning of component 116 within housing 102 to determine if component 116 is mounted for further analysis by apparatus 100.

In the exemplary embodiment, apparatus 100 also includes a plurality of sensors coupled to moveable lid 110. The sensors may be any sensors that enable apparatus 100 to function as described herein. For example, in one embodiment, the sensor is, but is not limited to, a contact spring-plunger sensor that only actuates when a predetermined actuation force is applied thereto. Apparatus 100 includes at least one seal sensor, such as a first seal sensor 144, a second seal sensor 146, and a third seal sensor 148 that are coupled to moveable lid 110. As described in more detail below, the at least one seal sensor is positioned to align with a sensing point on component 116 such that, when moveable lid 110 is in installation and sensing position 118, actuation of the at least one seal sensor verifies installation of the seal member.

In addition, apparatus 100 includes at least one lid sensor, such as a first lid sensor 150 and/or a second lid sensor 152 coupled to moveable lid 110. Similar to the at least one seal sensor, the at least one lid sensor is positioned to align with a sensing point on component 116 such that, when moveable lid 110 is in installation and sensing position 118, actuation of the at least one lid sensor verifies moveable lid 110 is in installation and sensing position 118 and facilitates verifying the feedback transmitted from the at least one seal sensor is accurate. For example, if first lid sensor 150 is actuated and first seal sensor 144 is not actuated, a determination can be made that the seal members are potentially improperly installed in component 116. However, if both first seal sensor 144 and first lid sensor 150 are not actuated when moveable lid 110 is in installation and sensing position 118, a determination can be made that there may be a malfunction with one or more parts of apparatus 100.

Figure 4:
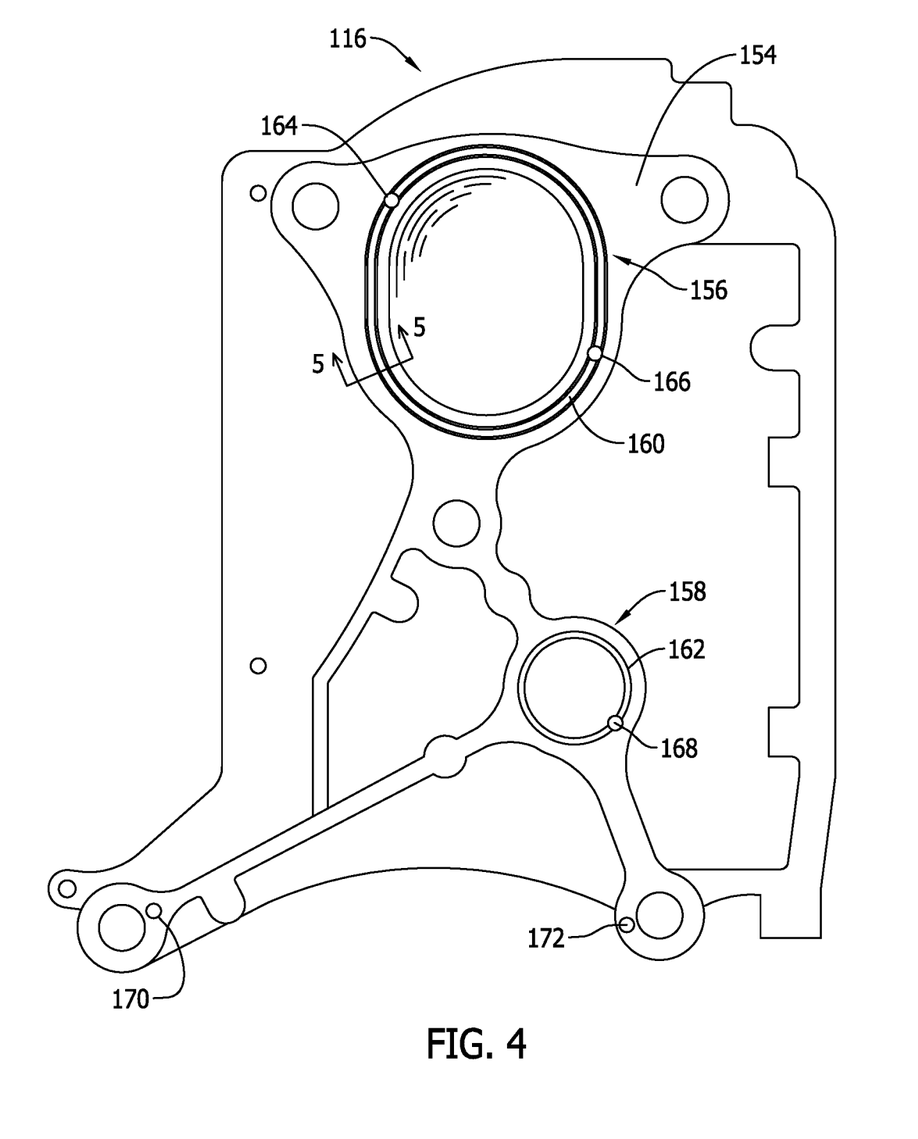
FIG. 4 is a top view of a plurality of sensing points that may be defined on the component shown in FIG. 3.
Figure 5:
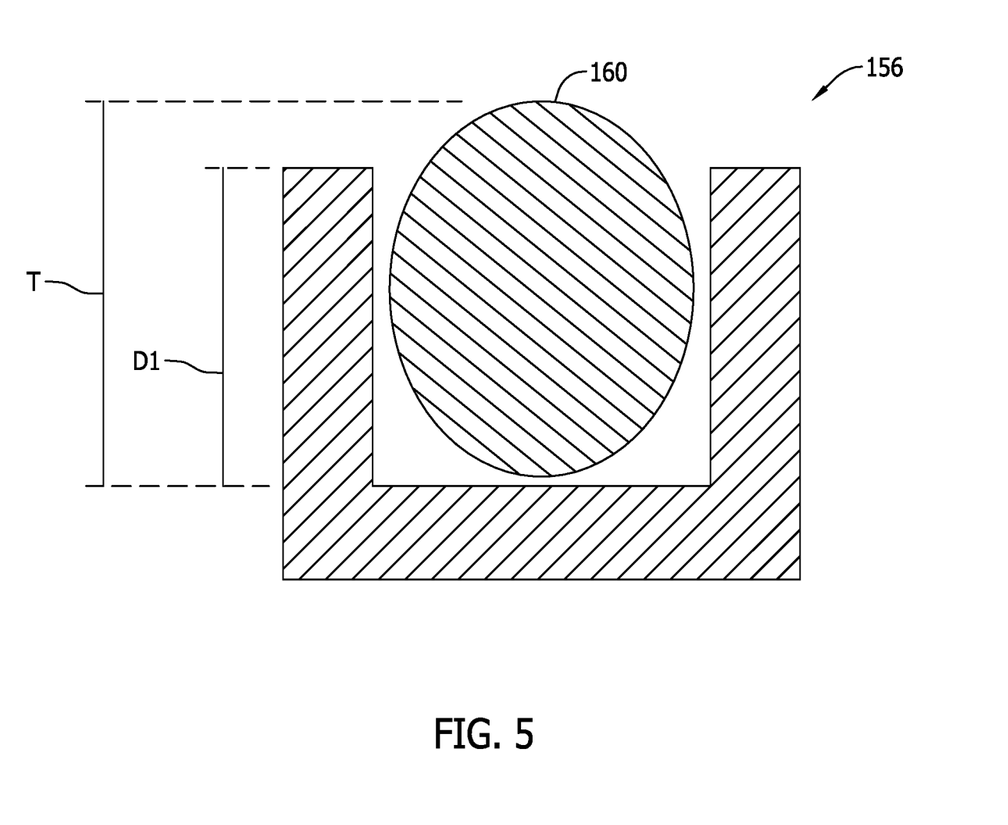
FIG. 5 is a cross-sectional view of a portion of the component shown in FIG. 4, and taken along Line 5-5.

FIG. 4 is a top view of a plurality of sensing points that may be defined on component 116, and FIG. 5 is a cross-sectional view of a portion of component 116, taken along line 5-5. In the exemplary embodiment, component 116 includes an outer surface 154 having a first groove 156 and a second groove 158 defined therein. A first seal member 160 is positioned within first groove 156, and a second seal member 162 is positioned within second groove 158. More specifically, referring to FIG. 5, first groove 156 extends within component 116 at a first depth D1. In addition, first seal member 160 has a thickness T that is greater than first depth D1 of first groove 156 such that first seal member 160 protrudes from first groove 156.

Referring back to FIG. 4, a plurality of sensing points are defined on component 116. More specifically, in the exemplary embodiment, a first sensing point 164 and a second sensing point 166 are defined on component 116 that selectively align with first groove 156, a third sensing point 168 is defined on component 116 that aligns with second groove 158, and a fourth sensing point 170 and a fifth sensing point 172 are defined on component 116 at locations other than at first groove 156 and second groove 158. First seal sensor 144 (shown in FIG. 1) is positioned to align with first sensing point 164, second seal sensor 146 (shown in FIG. 1) is positioned to align with second sensing point 166, third seal sensor 148 (shown in FIG. 1) is positioned to align with third sensing point 168, first lid sensor 150 (shown in FIG. 1) is positioned to align with fourth sensing point 170, and second lid sensor 152 (shown in FIG. 1) is positioned to align with fifth sensing point 172.

In operation, a component 116 received within housing 102 (shown in FIG. 1) includes first seal member 160 and second seal member 162 installed therein. Moveable lid 110 (shown in FIG. 1) is then moved from loading position 114 (shown in FIG. 2) to installation and sensing position 118 (shown in FIG. 3). When moveable lid 110 is in installation and sensing position 118, the plurality of sensors align with their respective sensing points to verify installation of first seal member 160 and second seal member 162. For example, first seal sensor 144 actuates when pressed against first seal member 160 positioned at first sensing point 164, and does not actuate when first seal member 160 is not positioned at first sensing point 164. More specifically, first seal sensor 144 extends outward from moveable lid 110 by a distance less than first depth D1 (shown in FIG. 5) of first groove 156 such that, if first seal member 160 is not positioned at first sensing point 164, first seal sensor 144 aligns with and is inserted within first groove 156. As such, an actuation force is not induced to first seal sensor 144 and an indication that first seal sensor 144 has not been actuated is provided to an operator of apparatus 100. Moreover, first seal sensor 144 extends outward from moveable lid 110 by a distance that facilitates providing contact with first seal member 160 within first groove 156. As such, if first seal member 160 is positioned at first sensing point 164, first seal member 160 induces an actuation force on first seal sensor 144.

When moveable lid 110 is in installation and sensing position 118, the plurality of sensors also facilitate installing first seal member 160 and second seal member 162 within component 116. In one embodiment, first seal member 160 and second seal member 162 are sized such that an installation force is required to position the seal members within first groove 156 and second groove 158. Moreover, first seal member 160 and second seal member 162 are manually positioned over first groove 156 and second groove 158, respectively. When moveable lid 110 is in installation and sensing position 118, the plurality of sensors are positioned to provide the installation force for securing first seal member 160 within first groove 156, and for securing second seal member 162 within second groove 158. As such, installation and installation verification of seal members within component 116 is performed simultaneously.

In addition, and for example, when moveable lid 110 is in installation and sensing position 118 first lid sensor 150 actuates when pressed against fourth sensing point 170 on component 116. As described above, actuation of first lid sensor 150 facilitates verifying moveable lid 110 is in installation and sensing position 118. Moreover, first lid sensor 150 extends a distance from moveable lid 110 such that first lid sensor 150 presses against component 116 at second sensing point 166 substantially simultaneously as first seal sensor 144 presses against first seal member 160 at first sensing point 164. As such, an installation status of first seal member 160 within first groove 156 is provided, and the accuracy of the installation status is verified as moveable lid 110 is moved from loading position 114 to installation and sensing position 118.

The apparatus and methods described herein facilitate verifying installation of seal members in a component. For example, the apparatus and methods described herein use a plurality of sensors coupled to a moveable lid to verify installation of the seal members. The plurality of sensors include seal sensors and lid sensors. The seal sensors only actuate when pressed against a seal member in the component, and the lid sensors are used to determine that the moveable lid is in a position that enables the seal sensors to interact with the seal members. As such, the apparatus and methods described herein facilitate reducing seal member installation errors and facilitate reducing manufacturing defects for parts formed from the component including the seal members installed therein.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus for use in installing and verifying installation of a seal member in a component, said apparatus comprising:
    a housing defining an interior sized to receive the component therein, and a moveable lid selectively positionable between a loading position and a sensing position; and
    at least one seal sensor coupled to said moveable lid and configured to selectively align with a first sensing point on the component when said moveable lid is in the sensing position, said at least one seal sensor configured to only actuate when pressed against the seal member positioned at the first sensing point.

2. The apparatus in accordance with claim 1, wherein the seal member is received within a groove that extends within the component at a first depth, said at least one seal sensor extending from said moveable lid by a distance less than the first depth.

3. The apparatus in accordance with claim 2, wherein the seal member has a thickness greater than the first depth of the groove such that the seal member protrudes from the groove, said at least one seal sensor extending from said moveable lid by the distance that provides contact with the seal member.

4. The apparatus in accordance with claim 1, wherein the component includes at least one mounting orifice defined therein, said apparatus further comprising at least one mounting member coupled to said housing and sized for insertion within the at least one mounting orifice such that the component is oriented in a predetermined orientation within said housing.

5. The apparatus in accordance with claim 4, wherein said at least one mounting member comprises a plurality of mounting members securely coupled to said housing.

6. The apparatus in accordance with claim 1 further comprising an adaptive mounting assembly that comprises a stationary member and a rotatable member coupled to said stationary member, said rotatable member comprising a first mounting pin and a second mounting pin, and said rotatable member configured to selectively position said first mounting pin or said second mounting pin in a mounting position for mating with the component.

7. The apparatus in accordance with claim 6, wherein said first mounting pin and said second mounting pin are shaped differently from each other, said rotatable member configured to selectively position said first mounting pin or said second mounting pin in the mounting position based on a type of component received in said housing.

8. The apparatus in accordance with claim 1 further comprising at least one lid sensor coupled to said moveable lid and positioned to align with a second sensing point on the component, wherein said at least one lid sensor is configured to actuate when pressed against the second sensing point on the component to verify said moveable lid is in the sensing position.

9. The apparatus in accordance with claim 8, wherein said at least one seal sensor is positioned to press against the seal member at the first sensing point and said at least one lid sensor is positioned to press against the component at the second sensing point simultaneously when the moveable lid is in the sensing position.

10. The apparatus in accordance with claim 1 further comprising an optical sensor coupled to said housing, wherein said optical sensor is configured to verify positioning of the component within said housing.

11. A method of installing and verifying installation of a seal member in a component, said method comprising:
    positioning the component within an interior of a housing, wherein the housing includes a moveable lid selectively positionable between a loading position and a sensing position, and at least one seal sensor coupled to the moveable lid; and
    positioning the moveable lid in the sensing position, wherein the at least one seal sensor selectively aligns with a first sensing point on the component when the moveable lid is in the sensing position, the at least one seal sensor configured to only actuate when pressed against the seal member positioned at the first sensing point.

12. The method in accordance with claim 11, wherein the seal member is received within a groove that extends within the component at a first depth, wherein positioning the at least one seal sensor comprises extending the at least one seal sensor from the moveable lid by a distance less than the first depth.

13. The method in accordance with claim 12, wherein the seal member has a thickness greater than the first depth of the groove, wherein positioning the at least one seal sensor comprises extending the at least one seal sensor from the moveable lid by the distance that provides contact with the seal member.

14. The method in accordance with claim 12, wherein positioning the at least one seal sensor comprises further comprises forcing the seal member into the groove with the at least one seal sensor.

15. The method in accordance with claim 11, wherein the component includes at least one mounting orifice defined therein, wherein positioning the component within an interior of a housing comprises mounting the component on at least one mounting member sized for insertion within the at least one mounting orifice.

16. The method in accordance with claim 15, wherein mounting the component on at least one mounting member comprises mounting the component on a plurality of mounting members such that the component is oriented in a predetermined orientation within the housing.

17. The method in accordance with claim 15, wherein mounting the component on at least one mounting member comprises selectively positioning a first mounting pin or a second mounting pin in a mounting position for mating with the component.

18. The method in accordance with claim 17, wherein selectively positioning a first mounting pin and a second mounting pin comprises selectively positioning the first mounting pin or the second mounting pin in the mounting position based on a type of component positioned within the housing.

19. The method in accordance with claim 11 further comprising positioning at least one lid sensor on the moveable lid to align with a second sensing point on the component, wherein the at least one lid sensor is configured to actuate when pressed against the second sensing point on the component to verify the moveable lid is in the sensing position.

20. The method in accordance with claim 19 further comprising extending the at least one seal sensor and the at least one lid sensor from the moveable lid such that the at least one seal sensor is positioned to press against the seal member at the first sensing point and the at least one lid sensor is positioned to press against the component at the second sensing point simultaneously when the moveable lid is in the sensing position.

* * * * *